(12) United States Patent
Cavallari et al.

(10) Patent No.: US 12,479,193 B2
(45) Date of Patent: Nov. 25, 2025

(54) HIGH STRENGTH GLAZING

(71) Applicant: ISOCLIMA S.P.A., Este (IT)

(72) Inventors: Paolo Cavallari, Trento (IT);
Guglielmo Macrelli, Rimini (IT)

(73) Assignee: ISOCLIMA S.P.A., Este (IT)

( * ) Notice: Subject to any disclaimer, the term of this patent is extended or adjusted under 35 U.S.C. 154(b) by 149 days.

(21) Appl. No.: 18/248,321

(22) PCT Filed: Oct. 6, 2021

(86) PCT No.: PCT/EP2021/025394
§ 371 (c)(1),
(2) Date: Apr. 7, 2023

(87) PCT Pub. No.: WO2022/073645
PCT Pub. Date: Apr. 17, 2022

(65) Prior Publication Data
US 2023/0382086 A1    Nov. 30, 2023

(30) Foreign Application Priority Data

Oct. 9, 2020   (EP) ..................................... 20425042

(51) Int. Cl.
*B32B 17/10*    (2006.01)
*B32B 7/022*    (2019.01)
(Continued)

(52) U.S. Cl.
CPC ........ *B32B 17/10045* (2013.01); *B32B 7/022* (2019.01); *B32B 17/10091* (2013.01); *B32B 17/10137* (2013.01); *B32B 17/1022* (2013.01); *B32B 17/10229* (2013.01); *B32B 17/10449* (2013.01); *B32B 17/10761* (2013.01); *B32B 17/10807* (2013.01); *C03C 17/3626* (2013.01); *C03C 17/3639* (2013.01);
(Continued)

(58) Field of Classification Search
CPC ............ B32B 17/10–1099; B60J 1/001; F41H 5/0407
See application file for complete search history.

(56) References Cited

U.S. PATENT DOCUMENTS

| 4,595,624 A | 6/1986 | Greathead |
| 4,625,070 A | 11/1986 | Berman et al. |

(Continued)

FOREIGN PATENT DOCUMENTS

| DE | 20202223 U1 | 10/2002 |
| DE | 102006042538 A1 | 3/2008 |

(Continued)

OTHER PUBLICATIONS

Glass Fundamentals NPL from Saint Gobain Glass.*

*Primary Examiner* — Z. Jim Yang
(74) *Attorney, Agent, or Firm* — HAUPTMAN HAM, LLP

(57) ABSTRACT

A glazing of high strength for a transparent marine window, architectural glazing or vehicle window in ground or air transportation includes at least an outer high strength glass ply and an inner high strength glass ply in a laminate, and a layered functional block arranged and integrated between the outer and inner high strength glass plies in the laminate. The layered functional block or a layered solar protection can include at least one annealed glass pane.

13 Claims, 2 Drawing Sheets

Figure 1:
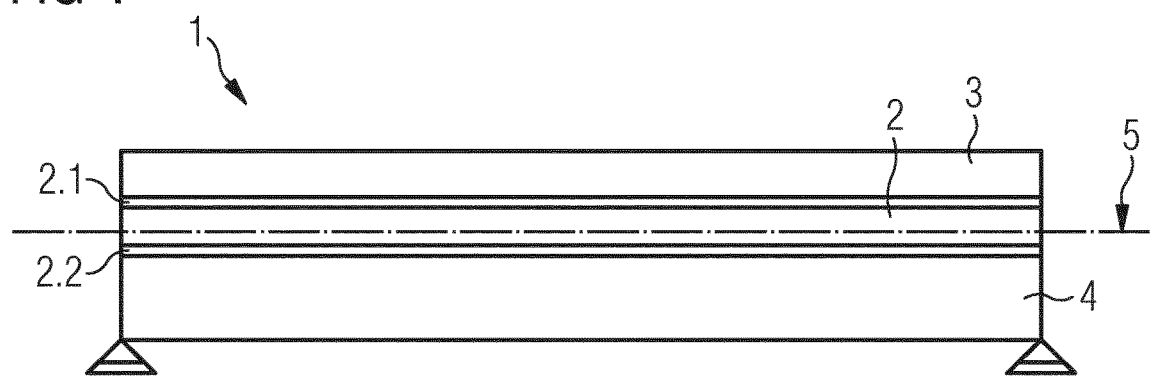

(51) Int. Cl.
*C03C 17/36* (2006.01)
*C03C 27/10* (2006.01)

(52) U.S. Cl.
CPC ...... *C03C 17/3644* (2013.01); *C03C 17/3649* (2013.01); *C03C 17/366* (2013.01); *C03C 17/3681* (2013.01); *C03C 27/10* (2013.01); *B32B 2307/542* (2013.01); *B32B 2307/546* (2013.01); *B32B 2605/12* (2013.01); *C03C 2218/152* (2013.01); *C03C 2218/154* (2013.01)

(56) References Cited

U.S. PATENT DOCUMENTS

| | | | | |
|---|---|---|---|---|
| 5,230,954 | A * | 7/1993 | Sakamoto | B32B 17/10761 428/421 |
| 5,514,428 | A | 5/1996 | Kunert | |
| 12,134,308 | B1 * | 11/2024 | Kingman | G02F 1/133528 |
| 2005/0002081 | A1 * | 1/2005 | Beteille | B32B 17/10293 359/275 |
| 2007/0178292 | A1 * | 8/2007 | Hasegawa | B32B 27/42 428/216 |
| 2009/0011205 | A1 * | 1/2009 | Thiel | C03C 17/3681 428/215 |
| 2009/0197098 | A1 * | 8/2009 | Polcyn | H05K 9/0094 427/209 |
| 2015/0140301 | A1 * | 5/2015 | Fisher | B32B 37/182 156/99 |
| 2015/0165729 | A1 * | 6/2015 | Legrand | B60J 7/043 136/246 |
| 2015/0202845 | A1 * | 7/2015 | Cherekdjian | B32B 17/1077 428/424.2 |
| 2016/0002103 | A1 * | 1/2016 | Wang | C03C 3/091 428/141 |
| 2016/0354996 | A1 * | 12/2016 | Alder | C03C 3/091 |
| 2017/0100991 | A1 * | 4/2017 | Cammenga | G02F 1/1533 |
| 2018/0082669 | A1 * | 3/2018 | Lu | B32B 17/1055 |
| 2018/0281568 | A1 * | 10/2018 | Nakamura | B60J 1/00 |
| 2020/0180997 | A1 * | 6/2020 | Cid-Aguilar | C03C 4/02 |
| 2021/0138767 | A1 * | 5/2021 | Mannheim Astete | B32B 17/10889 |
| 2021/0221103 | A1 * | 7/2021 | Pilz | C03C 27/10 |
| 2022/0055354 | A1 * | 2/2022 | Allam | C03B 23/0252 |
| 2022/0176678 | A1 * | 6/2022 | Bhatia | B32B 17/10816 |
| 2022/0196369 | A1 * | 6/2022 | Casutt | B32B 17/10752 |

FOREIGN PATENT DOCUMENTS

| | | |
|---|---|---|
| DE | 102006042538 B4 | 7/2011 |
| EP | 0137613 B1 | 4/1988 |
| EP | 0630322 B1 | 5/1999 |
| EP | 3981592 A1 | 4/2022 |
| GB | 1576847 A | 10/1980 |
| WO | 03068501 A1 | 8/2003 |
| WO | 2022073645 A1 | 4/2022 |

* cited by examiner

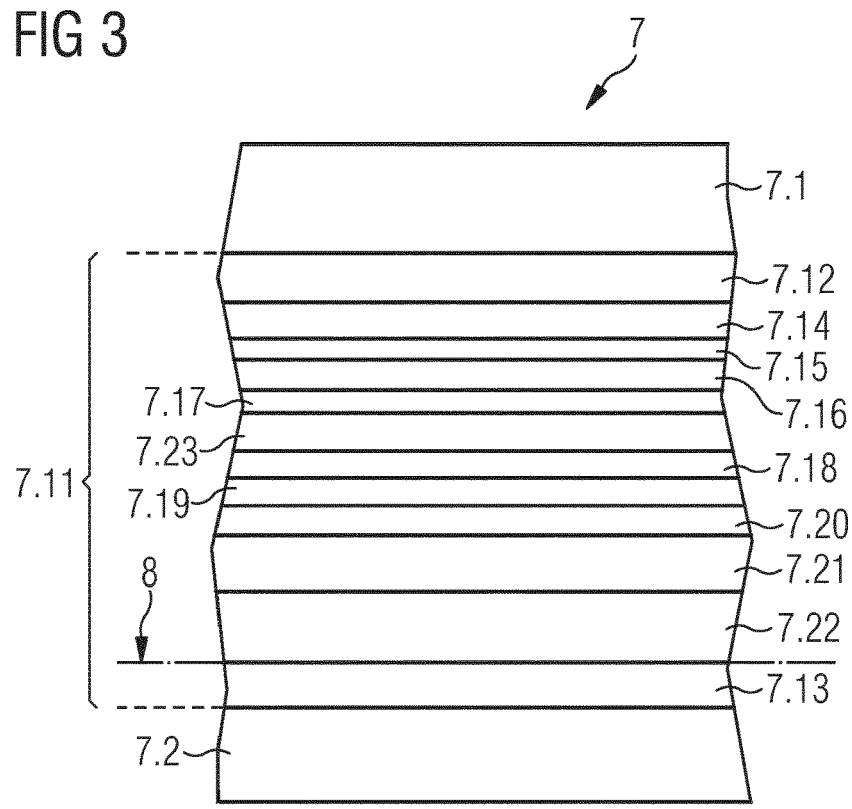
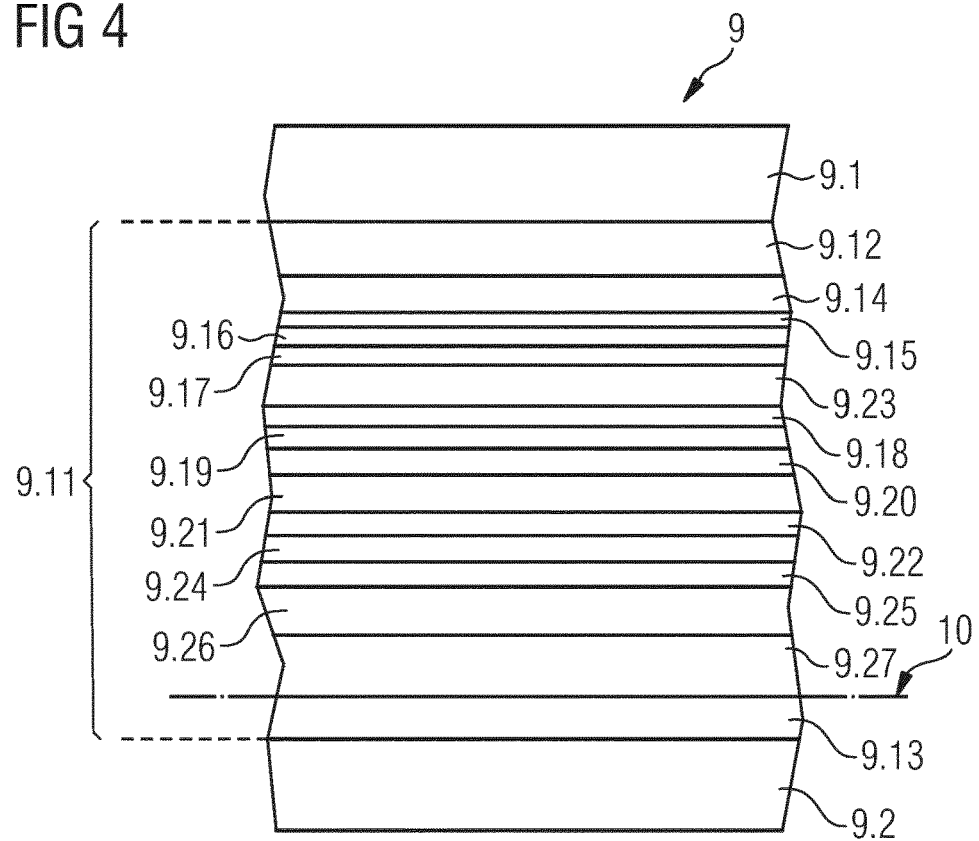

HIGH STRENGTH GLAZING

RELATED APPLICATIONS

The present application is a U.S. National Phase of International Application Number PCT/EP2021/025394 filed Oct. 6, 2021, and claims priority to European Application Number 20425042.7 filed Oct. 9, 2020.

The present invention refers to a glazing of high strength and to a method for the production of this glazing that can be used, particularly, as a transparent marine window, but also as an architectural glazing or vehicle window in ground or air transportation.

Concerning, for instance, marine widows, high loads resulting from waves or gust of winds or squalls impinging on marine windows can result in high mechanical loads or even extremely high loads on marine windows leading to possible damage or even breakage of the window or glazing and, therefore, a danger for the passengers and crew inside the ship can result. Similar considerations are also valid to a high strength glazing used in buildings or ground and air vehicles.

It is, therefore, an object of the invention to provide a high strength glazing showing reduced potential of damage even under high mechanical load conditions.

This object is solved by the high strength glazing or window of the invention. Accordingly, the glazing of high strength, particularly for a marine window, comprises at least an outer high strength glass ply and an inner high strength glass ply in a laminate, and a layered functional block arranged and integrated between the outer and inner high strength glass plies in the laminate.

The glazing of the invention provides the remarkable advantage that the functional block itself is protected against a too strong mechanical stress since the functional block is arranged in position between the high strength glass plies or glass panes. Accordingly, the present invention enables a long durability of the functional block without damages like, for instance, cracks in the functional block which, consequently, also leads to a long durability of the whole laminate of the glazing.

The "high strength glass plies" of the invention show preferably a strength at breakage ranging from ca. 160-400 MPa of strengthened glass. This means that allowable mechanical stress of the high strength glass plies is ca. 40-100 MPa for short load duration. Strengthened glass corresponds preferably to tempered or strengthened glass or safety glass processed by controlled thermal or chemical treatments to increase its strength compared to float glass or annealed glass.

The layered functional block provides additional functions of the glazing mainly but not limited to solar protection, for instance, a switchable transmittance of the glazing, electrical circuit layers, or an antenna layer and so on.

The layered functional block comprises preferably a layered solar protecting means arranged and integrated between the outer and inner high strength glass plies in the laminate, wherein the layered solar protecting means suppresses UV (ultraviolet) and/or IR (infrared) solar radiation, preferably by, but not limited to, reflection. In this embodiment of the invention, the layered solar protecting means itself is protected against a too strong, not allowable mechanical stress due to its position between the high strength glass plies. Accordingly, the present invention enables a long durability of the solar protection without damages like, for instance, cracks in its structure which, consequently results in a long durability of the whole laminate of the high strength glazing.

Preferably, the glazing comprises a neutral line or layer extending within, adjacent to, or in proximity of the layered functional block or the solar protecting means in order to avoid too high, non-allowable mechanical stress on the functional block or the solar protecting layers of the invention. The "neutral line or layer" is a line or neutral layer of the section area of the glazing which exhibits near zero or at most an allowable mechanical stress if the glazing is subjected to a mechanical load from outside. The neutral line or layer of the glazing extends through the center or main emphasis of the cross section area of the unloaded glazing.

The functional block or the layered solar protecting means may be located in the glazing of the invention so that mechanical stress resulting from an outside flexural load acting on the outer high strength glass ply is not higher than an allowable flexural tensile stress of the functional block or the layered solar protecting means in order to avoid its damage.

The layered functional block may comprise at least one annealed glass pane. Preferably, the annealed glass pane is located in the glazing so that a mechanical stress resulting from an outside flexural load acting on the outer high strength glass ply is not higher than an allowable flexural tensile stress of the annealed glass pane. The annealed glass pane can extend on, along or in parallel to a neutral line or neutral layer of the glazing.

The layered solar protecting means comprises preferably at least one annealed glass pane and a solar protecting layer provided on the annealed glass pane wherein the annealed glass pane is located in the glazing so that mechanical stress resulting from an outside flexural load acting on the outer high strength glass ply is not higher than an allowable flexural tensile stress of the annealed glass pane, wherein the annealed glass pane extends on, along or in parallel to the neutral line or neutral area of the glazing.

The central part of the section area of the glazing, close to the neutral line or neutral layer of the glazing is usually in slight compression or at most it is submitted to a slight tension.

According to the invention, the best location with only small or minimum stress of the annealed glass pane is exactly in proximity of the neutral line or neutral layer on the side showing to the outer high strength glass ply of the glazing. The invention incorporates such functional block or solar protection elements into the structural glazing cross section positioning them adjacent or in proximity or adjacent to the neutral layer of the glazing.

Annealed glass, which may also be referred to as non-strengthened glass or float glass, shows usually a strength at breakage ranging from 40-70 MPa. This means that allowable mechanical stress of the annealed glass pane is ranging from 10 to 18 MPa for short load duration.

Preferably, the layered solar protecting means comprises an interlayer or multiple interlayers which show a high elastic modulus in order to reduce the potential of undue tensile stress in the annealed glass pane.

The layered solar protecting means of the invention comprises preferably an annealed glass pane and a solar protecting layer for suppressing UV (ultraviolet) and/or IR (infrared) solar radiation wherein the solar protecting layer is arranged between the outer high strength glass ply and the annealed glass pane. The solar protecting layer may comprise a thin metallic layer that can be selected from the group consisting of silver, gold, copper, aluminium, and combinations thereof. Preferably, the thin metallic layer is made of a silver coating or multiple silver coatings. The layered solar protecting means of the invention may comprise a solar protecting layer made by a sputtering process incorporating single or multiple silver coatings wherein triple silver coatings show almost perfect reflectance in the IR or NIR and/or UV solar regions and almost perfect transmittance in the region of visual light.

Advantageously, using industrial sputtering processes, silver coatings as solar protecting layers can be sputtered or deposited on annealed glass panes resulting in, for instance, double, triple and quadruple silver layers approaching the ideal characteristics of almost full transmittance in the visible part of the solar wavelength spectrum from 380 nm-780 nm and almost complete reflectance in the UV 300 nm-380 nm and NIR 780 nm-2500 nm parts of the solar wavelength spectrum. Particularly, triple silver coatings show almost perfect reflectance in the UV and/or IR or NIR solar regions and almost perfect transmittance in the region of visual light.

The high strength glass plies of the invention may be made of glass chemically strengthened by ion exchange or they may be made of thermally strengthened glass. In further alternative, the high strength glass plies can be chemically strengthened by ion exchange and it can be thermally strengthened, or one of the high strength glass plies can be chemically strengthened by ion exchange and the other one of the high strength glass plies can be thermally strengthened. Accordingly, a big range of different mechanical loading cases or applications can be covered by the invention.

The layered solar protecting means may comprise an annealed glass pane and a solar protecting layer made of a physical or chemical vapour deposited coating on the annealed glass pane.

The layered solar protecting means can be made by a sputtering process for producing a transparent conductive layer, a reflecting layer or an anti-reflecting or absorbing layer. The layered solar protecting means may be made by a chemical process for producing a transparent conductive layer, a reflecting layer or anti-reflecting or absorbing layer. The layered functional block or the layered solar protecting means can comprise a sputtered or deposited top protecting interference layer, a sputtered or deposited blocker layer, a sputtered or deposited silver coating or layer, a sputtered or deposited seed layer, a sputtered or deposited interference base layer and an annealed glass pane which is a substrate for this thin films system.

The inner and outer high strength glass plies of the invention may be provided in a tensile part of the glazing or of its section when the glazing is subjected to a flexural load in order to exclude or reduce tensile stress from the solar protection layer means.

Preferably, the inner and outer high strength glass plies are arranged in locations of the glazing or of its section area where stress is below an allowable value.

The invention refers also to a method for producing a high strength glazing comprising the following steps:
  providing at least an outer high strength glass ply and an inner high strength glass ply, and a layered functional block or a layered solar protecting means;
  arranging the layered functional block or the layered solar protecting means between the outer and inner high strength glass plies to obtain a pre-glazing stack; and then
  treating the pre-glazing stack in an autoclave to laminate the pre-glazing stack in order to obtain the high strength glazing.

Figure 2:
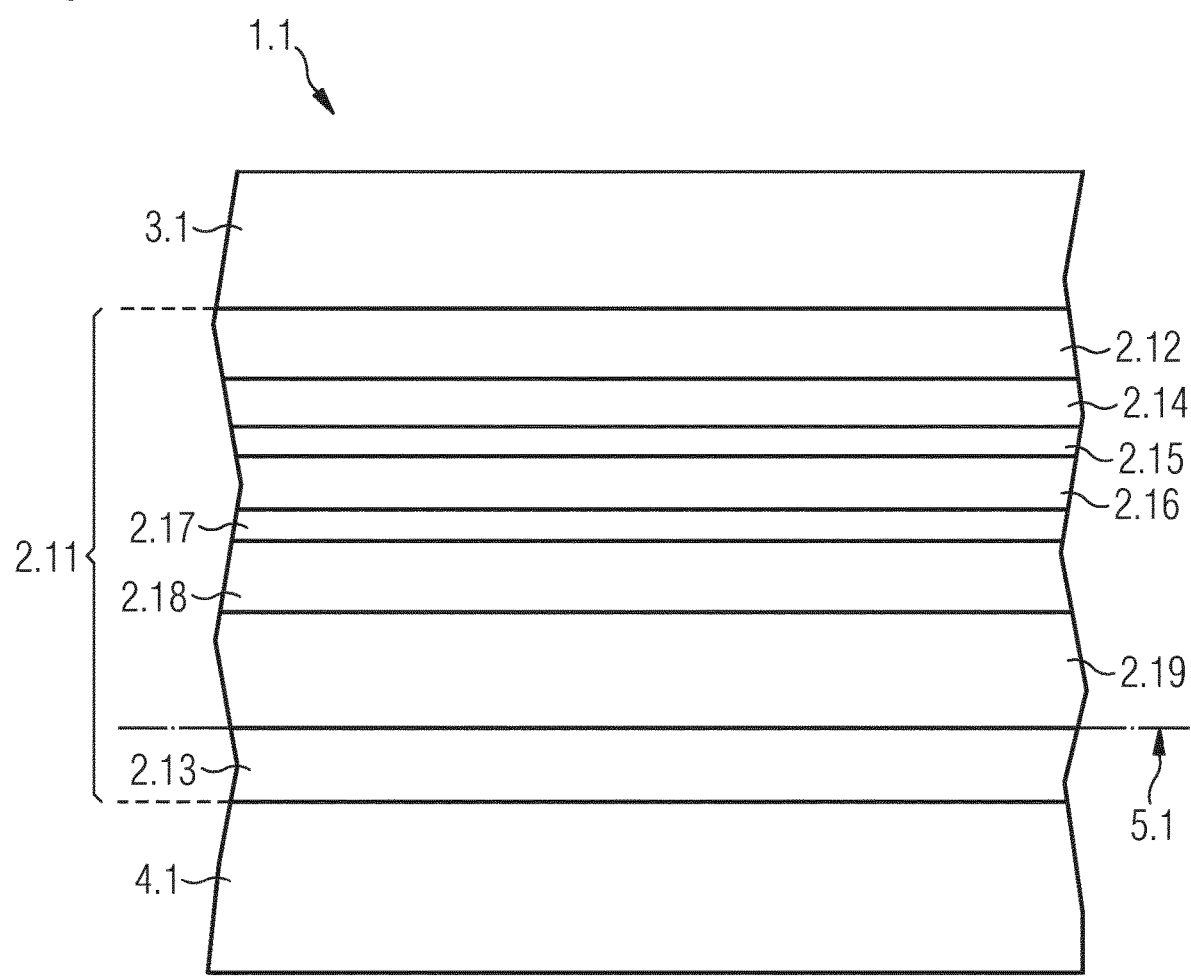

Further advantageous embodiments of the invention are mentioned in the dependent claims. Advantageous embodiments and advantages of the invention could also be derived from the following description of exemplified and preferred embodiments in connection with the drawings:

FIG. 1 a schematic section view of a high strength glazing according to a first preferred embodiment of the invention comprising a layered solar protecting means;

FIG. 2 a schematic section view of a high strength glazing according to a second preferred embodiment of the invention comprising a layered single silver solar protecting means;

FIG. 3 a schematic section view of a high strength glazing according to a third preferred embodiment of the invention comprising a layered double silver solar protecting means; and FIG. 4 a schematic section view of a high strength glazing according to a fourth preferred embodiment of the invention comprising a layered triple silver solar protecting means.

FIG. 1 shows a schematic section view of a high strength glazing 1 according to a first preferred embodiment of the invention. The high strength glazing 1 has a layered solar protecting means 2 as a functional block. The high strength glazing 1 is transparent to visual light. The dimensions of the high strength glazing may be ca. 3000 mm×2000 mm, but they are not limited thereto.

The high strength glazing 1 or window, which can be used as an marine window in a vessel, comprises an outer high strength glass ply 3 directed to an outside of an vehicle or vessel, an inner high strength glass ply 4 directed to an inside of the vehicle, vessel or building in a laminate, and a layered solar protecting means 2 arranged and integrated between the outer and inner high strength glass plies 3 and 4 in the laminate.

The high strength glass plies 3 and 4 of the invention exhibit preferably strength at breakage of ca. 240 MPa of strengthened glass. This means that allowable mechanical stress of each of the high strength glass plies 3 and 4 is ca. 60 MPa for short load duration. The high strength glass plies 3 and 4 are made of strengthened glass corresponding to tempered or strengthened glass or safety glass.

The layered solar protecting means 2 comprises an outer adhesive layer 2.1 and an inner adhesive layer 2.2 and it suppresses UV (ultraviolet) and/or IR (infrared) solar radiation. The outer adhesive layer 2.1 is adjacent to the outer high strength glass ply 3 and the inner adhesive layer 2.2 is adjacent to the inner high strength glass ply 4. The inner and outer adhesive layers 2.1 and 2.2 can be made of PVB (Poly Vinyl Butyral. The layered solar protecting means 2 preferably comprises, but it is not limited to, an annealed non-tempered glass pane coated with a functional solar protection thin films coating.

The high strength glazing 1 comprises a neutral line or neutral layer 5 showing zero mechanical stress if the glazing 1 is subjected to a load from the outside. The neutral layer 5 extends within or in the proximity of the layered solar protecting means 2 in order to avoid too high mechanical stress on the layered solar protecting means 2.

FIG. 2 shows a further schematic partial section view of a high strength glazing 1.1 according to a further preferred embodiment of the invention. The high strength glazing 1.1 has a layered solar protecting means 2.11 as a functional block.

The high strength glazing 1.1 comprises an outer high strength glass ply 3.1, an inner high strength glass ply 4.1 in a laminate, and the layered solar protecting means 2.11 arranged and integrated between the outer and inner high strength glass plies 3.1 and 4.1 in the laminate.

The layered solar protecting means 2.11 comprises an outer adhesive layer 2.12, an inner adhesive layer 2.13 and an annealed glass pane 2.19. The layered solar protecting means 2.11 suppresses UV (ultraviolet) and/or IR (infrared) solar radiation. The high strength glazing 1.1 comprises again a neutral line or a neutral layer 5.1 extending within the layered solar protecting means 2.11. The outer adhesive layer 2.12 is adjacent to the outer high strength glass ply 3.1 and the inner adhesive layer 2.13 is adjacent to the inner high strength glass ply 4.1.

The inner and outer adhesive layers 2.12 and 2.13 can be made of PVB (Poly Vinyl Butyral), preferably a high modulus PVB like DG41® of Eastmann or Extra-Strong ES ° of Kuraray-Trosifol. Another suitable material of the outer and inner adhesive layers 2.12 and 2.13 is an ionomeric resin like Sentryglass® ionoplast interlayer of Kuraray-Trosifol. Other interlayers used in the glass lamination are aliphatic thermoplastic polyurethane (TPU) even though their elastic modulus is typically lower than structural PVB or Ionomeric interlayers. The optimal layered cross-section under external flexural loads is obtained when stresses are transferred uniformly through the layers, and this is achieved when the shear modulus of the connecting adhesive layers 2.12 and 2.13 is higher than >ca. 50 MPa. The thickness of the adhesive layers 2.12 and 2.13 can be between 0.3 mm and 3 mm, preferably the thickness amounts to ca. 1.52 mm.

In the embodiment of FIG. 2, the solar protection is based on a thin films system arranged or deposited on the annealed glass pane 2.19 as a carrier or substrate having a thickness between ca. 2 mm and 6 mm, preferably of 4 mm.

The solar protection function is achieved by reflecting the near infrared portion ranging from 780 nm to 2500 nm of the solar radiation wavelength by a silver layer 2.16 as a solar protecting layer which has a thickness between 10 nm to 20 nm, preferably of 15 nm. In order to allow the transmission of the visible part of solar radiation ranging from 380 nm to 780 nm in wavelength, the silver layer 2.16 is arranged between a top protecting interference layer 2.14 and an interference base layer 2.18 in a thin films system.

Additionally, in order to allow an optimal nucleation of the silver layer 2.16 and to protect it from chemical reactions that can lead to corrosion and degradation, the silver layer 2.16 is deposited on a seed layer 2.17 made of, for instance, ZnO showing a thickness which is smaller than <15 nm. Preferably, the thickness of the seed layer 2.17 amounts to 10 nm. Further, the silver layer 2.16 is protected by a blocker layer 2.15 made of, for instance, metal or metal suboxide, preferably NiCr or NiCrO$_x$, having a thickness between 2 nm to 8 nm, preferably 5 nm.

Between the outer and inner adhesive layers 2.12 and 2.13, the layered solar protecting means 2 comprises the following layers and coatings in the shown sequence:

- the top protecting interference layer 2.14 made of, for instance, Si$_3$N$_4$ having a thickness of ca. 2 nm-20 nm, preferably ca. 11 nm, and/or of ZnO having a thickness between 30 nm-70 nm, preferably 50 nm;
- the sputtered blocker layer 2.15 made of, for instance, NiCr or NiCrO$_x$ with a thickness of ca. 2 nm-6 nm, preferably 4 nm;
- the sputtered silver coating or layer 2.16 with a thickness between ca. 12 nm-15 nm, preferably 13.5 nm;
- the seed layer 2.17 made of, for instance, ZnO or ZnO:SnO$_2$:Al$_2$O$_3$ with a thickness of ca. 3 nm-10 nm, preferably 6.5 nm;
- the interference/base layer 2.18 made of, for instance, Zinc Stannate ZTO or SnO$_2$ with a thickness in the range between ca. 30 nm-80 nm, preferably ca. 55 nm; and
- the annealed glass pane 2.19 adjacent to the inner adhesive layer 2.13.

The transparent annealed glass pane 2.19 corresponds to an annealed non-tempered glass or float glass and shows preferably a strength at breakage of ca. 70 MPa. This means that allowable mechanical stress of the annealed glass pane 2.19 is ca. 17.5 MPa for short load duration. The annealed glass pane 2.19 is adjacent to the neutral layer 5.1 of the high strength glazing 1.1.

The outer and inner adhesive layers 2.12 and 2.13 exhibit a high elastic modulus which results in a shear modulus with a value of ca. 50 MPa in order to reduce the potential of undue tensile stress that may be higher than >ca. 17.5 MPa in the annealed glass pane 2.19.

The sputtered silver coating 2.16 is a solar protecting layer approaching the ideal characteristics of almost full transmittance in the visible part of the solar wavelength spectrum from 380 nm-780 nm and almost complete reflectance in the UV 300 nm-380 nm and IR 780 nm-2500 nm parts of the solar spectrum.

The high strength glazing 1.1 can be produced by providing the outer high strength glass ply 3.1 and the inner high strength glass ply 4.1, and the layered solar protecting means 2.11 between the outer and inner high strength glass plies 3.1 and 4.1 to obtain a pre-glazing stack.

The thin films system of the layered solar protecting means 2.11 can be provided and produced step by step in the following manner:

- The interference base layer 2.18 is deposited by sputtering or chemical vapour deposition on the annealed glass pane 2.19;
- Then the seed layer 2.17 or coating is deposited by sputtering or chemical vapour deposition on the interference base layer 2.18;
- Now the silver coating 2.16 is sputtered or deposited onto the seed layer 2.17;
- Afterwards the blocker or absorber layer 2.15 or coating is sputtered or deposited on the silver coating 2.16;
- Then the interference top layer 2.14 is deposited or sputtered on the blocker layer 2.15.

The so obtained thin films system is arranged between the high modulus polymeric outer and inner adhesive layers 2.12 and 2.13 to obtain the layered solar protection means 2.11 that is assembled between with the outer and inner high strength glass panes 3.1 and 4.1 to provide the pre-glazing stack.

Finally, the pre-glazing stack is treated in an autoclave to laminate the pre-glazing stack in order to obtain full adhesion between the layers and the whole layered high strength glazing 1.1.

FIG. 3 shows a further schematic partial section view of a high strength glazing 7 according to a third preferred embodiment of the invention. The high strength glazing 7 has a layered solar protecting means 7.11 as a functional block.

The high strength glazing 7 comprises an outer high strength glass ply 7.1, an inner high strength glass ply 7.2 in a laminate, and the layered solar protecting means 7.11 arranged and integrated between the outer and inner high strength glass plies 7.1 and 7.2 in the laminate.

The layered solar protecting means 7.11 comprises an outer adhesive layer 7.12 and an inner adhesive layer 7.13 and it suppresses UV (ultraviolet) and/or IR (infrared) solar radiation. The high strength glazing 7 comprises again a neutral line or a neutral layer 8 extending within the layered solar protecting means 7.11. The outer adhesive layer 7.12 is adjacent to the outer high strength glass ply 7.1 and the inner adhesive layer 7.13 is adjacent to the inner high strength glass ply 7.1. The inner and outer adhesive layers 7.12 and 7.13 can be made of PVB (Poly Vinyl Butyral), preferably high modulus PVB or ionomeric resin SGP®.

Between the outer and inner adhesive layers 7.12 and 7.13, the layered solar protecting means 7.11 comprises the following layers and coatings in the shown sequence as a thin films system:
- a sputtered or deposited top protecting interference layer 7.14 made, for instance, of $Si_3N_4$ and/or ZnO;
- a sputtered or deposited blocker layer 7.15 made, for instance, of NiCr or $NiCrO_x$;
- a first sputtered silver coating 7.16;
- a seed layer 7.17 made, for instance, of ZnO or $ZnO:SnO_2:Al_2O_3$;
- an interference layer 7.23 made, for instance, of $Si_3N_4$ and/or ZnO;
- a further sputtered blocker layer 7.18 made, for instance, of NiCr or $NiCrO_x$;
- a second sputtered silver coating 7.19;
- a further seed layer 7.20 made, for instance, of ZnO or $ZnO:SnO_2:Al_2O_3$,
- a interference base layer 7.21 made, for instance, of ZTO or $SnO_2$; and
- an annealed glass pane 7.22 adjacent to the inner adhesive layer 7.13.

The annealed glass pane 7.22 extends adjacent to the neutral axis 8. The embodiment of FIG. 3 is based on a double-silver thin film coating that enhances the filter selectivity of high visible transmittance versus high reflectance of near infrared and UV solar radiation.

FIG. 4 shows a further schematic partial section view of a high strength glazing 9 according to a fourth preferred embodiment of the invention that presents a further yet optimized solar radiation filtering selectivity. The high strength glazing 9 has a layered solar protecting means 9.11 as a functional block.

The high strength glazing 9 comprises an outer high strength glass ply 9.1, an inner high strength glass ply 9.2 in a laminate, and the layered solar protecting means 9.11 arranged and integrated between the outer and inner high strength glass plies 9.1 and 9.2 in the laminate.

The layered solar protecting means 9.11 comprises an outer adhesive layer 9.12 and an inner adhesive layer 9.13 and it suppresses UV (ultraviolet) and/or IR (infrared) solar radiation. The high strength glazing 9 comprises again a neutral line or a neutral layer 10 extending within the layered solar protecting means 9.11. The outer adhesive layer 9.12 is adjacent to the outer high strength glass ply 9.1 and the inner adhesive layer 9.13 is adjacent to the inner high strength glass ply 9.2. The inner and outer adhesive layers 9.12 and 9.13 can be made of high modulus PVB (Poly Vinyl Butyral) or SGP®.

Between the outer and inner adhesive layers 9.12 and 9.13, the layered solar protecting means 9.11 comprises the following layers and coatings in the shown sequence:
- a sputtered or deposited top protecting interference layer 9.14 made, for instance, of $Si_3N_4$ and/or ZnO;
- a sputtered or deposited blocker layer 9.15 made, for instance, of NiCr or $NiCrO_x$;
- a first sputtered or deposited silver coating 9.16;
- a sputtered or deposited seed layer 9.17 made, for instance, of ZnO or $ZnO:SnO_2:Al_2O_3$;
- a sputtered or deposited interference layer 9.23 made, for instance, of $Si_3N_4$ and/or ZnO;
- a further sputtered or deposited blocker layer 9.18 made, for instance, of NiCr or $NiCrO_x$;
- a second sputtered or deposited silver coating 9.19;
- a further sputtered or deposited seed layer 9.20 made, for instance, of ZnO or $ZnO:SnO_2:Al_2O_3$;
- a further sputtered or deposited interference layer 9.21 made, for instance, of $Si_3N_4$ and/or ZnO;
- a sputtered or deposited blocker layer 9.22 made, for instance, of NiCr or $NiCrO_x$;
- a third sputtered or deposited silver coating 9.24;
- a sputtered or deposited seed layer 9.25 made, for instance, of ZnO or $ZnO:SnO_2:Al_2O_3$;
- a sputtered or deposited interference layer 9.26 made, for instance, of ZTO or $SnO_2$; and
- an annealed glass pane 9.27 adjacent to the inner adhesive layer 9.13. The annealed glass pane 9.27 extends adjacent to the neutral layer 10.

The invention claimed is:

1. Glazing of high strength, comprising:
at least an outer glass ply and an inner glass ply in a laminate, wherein each of the outer glass ply and the inner glass ply has a strength at breakage ranging from ca. 160-400 MPa and a short term allowable mechanical stress of ca. 40-100 MPa; and
a layered functional block arranged and integrated between the outer and inner glass plies in the laminate, wherein the layered functional block comprises
an outer adhesive layer on the outer glass ply;
an inner adhesive layer on the inner glass ply;
at least one thin films system having the following layered sequence:
a sputtered or deposited top protecting interference layer;
a sputtered or deposited blocker layer;
a sputtered or deposited silver coating or layer;
a sputtered or deposited seed layer; and
a sputtered or deposited interference base layer; and
at least one annealed glass pane having a strength at breakage ranging from ca. 40-70 MPa and a short term allowable mechanical stress of ca. 10 to 18 MPa,
wherein the at least one thin films system is provided on the annealed glass pane.

2. Glazing according to claim 1, wherein the layered functional block comprises a layered solar protecting means arranged and integrated between the outer and inner glass plies in the laminate, wherein the layered solar protecting means suppresses NIR/IR (Near infrared/Infrared) an/or UV (ultraviolet) of the solar radiation by reflection or absorption.

3. Glazing according to claim 1, wherein the glazing comprises a neutral line or neutral layer extending within, adjacent to, or in proximity of the layered functional block in response to the glazing being subjected to a mechanical load from outside.

4. Glazing according to claim 1, wherein the annealed glass pane extends on, adjacent to, along or in parallel to a neutral line or neutral layer of the glazing.

5. Glazing according to claim 1, wherein the inner and outer adhesive layers have an elastic shear modulus of G>50 MPa, respectively.

6. Glazing according to claim 1, wherein
the inner and outer glass plies are made of glass chemically strengthened by ion exchange, or the inner and outer glass plies are made of glass thermally strengthened, or the inner and outer glass plies are hybrid strengthened glass, first thermally strengthened and then chemically strengthened by ion exchange, or one of the inner and outer glass plies is chemically strengthened by ion exchange and the other one of the inner and outer glass plies is thermally strengthened.

7. Glazing according to claim 2, wherein the thin films system has a physical or chemical vapor deposited coating on the annealed glass pane, or is made by physical or chemical vapor deposition or sputtering incorporating single or multiple metallic coatings or silver coatings.

8. Glazing according to claim 1, wherein the thin films system comprises the following layers and coatings in the following sequence:
the sputtered or deposited top protecting interference layer;
the sputtered or deposited blocker layer;
the sputtered or deposited silver coating;
the sputtered or deposited seed layer;
a further sputtered or deposited interference layer;
a further sputtered or deposited blocker layer;
a further sputtered or deposited silver coating;
a further sputtered or deposited seed layer;
a yet further sputtered or deposited interference layer;
a yet further sputtered or deposited blocker layer;
a yet further sputtered or deposited silver coating;
a yet further sputtered or deposited seed layer; and
the sputtered or deposited base interference layer sputtered or deposited on the annealed glass pane.

9. Glazing according to claim 1, wherein the thin films system comprises single or multiple sequences of silver layers and is directly sputtered or deposited on one of the surfaces of the annealed glass pane.

10. Glazing according to claim 1, wherein the thin films system comprises the following layers and coatings in sequence:
the top protecting interference layer made of $Si_3N_4$ having a thickness of ca. 2 nm-20 nm and/or of ZnO having a thickness between 30 nm-70 nm;
the sputtered blocker layer made of NiCr or $NiCrO_x$ with a thickness of ca. 2 nm-6 nm;
the sputtered silver coating or layer with a thickness between ca. 12 nm-15 nm;
the seed layer made of ZnO or $ZnO:SnO_2:Al_2O_3$ with a thickness of ca. 3 nm-10 nm; and
the interference base layer made of Zinc Stannate, ZTO or $SnO_2$ with a thickness in the range between ca. 30 nm-80 nm.

11. Glazing according to claim 2, wherein the glazing comprises a neutral line or neutral layer extending within, adjacent to, or in proximity the layered solar protecting means in response to the glazing being subjected to a mechanical load from outside.

12. Glazing according to claim 1, wherein the glazing is used in a marine window.

13. Method of producing a high strength glazing for a marine window, the method comprising:
providing at least an outer glass ply, an inner glass ply, and a layered functional block;
arranging the layered functional block between the outer and inner glass plies to obtain a pre-glazing stack; and then
treating the pre-glazing stack in an autoclave to laminate the pre-glazing stack in order to obtain the glazing, wherein the glazing comprises:
at least the outer glass ply and the inner glass ply in a laminate, wherein each of the outer glass ply and the inner glass ply has a strength at breakage ranging from ca. 160-400 MPa and a short term allowable mechanical stress of ca. 40-100 MPa; and
the layered functional block arranged and integrated between the outer and inner glass plies in the laminate, wherein the layered functional block comprises
an outer adhesive layer on the outer glass ply;
an inner adhesive layer on the inner glass ply;
at least one thin films system having the following layered sequence:
a sputtered or deposited top protecting interference layer;
a sputtered or deposited blocker layer;
a sputtered or deposited silver coating or layer;
a sputtered or deposited seed layer; and
a sputtered or deposited interference base layer; and
at least one annealed glass pane having a strength at breakage ranging from ca. 40-70 MPa and a short term allowable mechanical stress of ca. 10 to 18 MPa,
wherein the at least one thin films system is provided on the annealed glass pane.

* * * * *